(12) United States Patent
Buckley et al.

(10) Patent No.: US 10,638,416 B2
(45) Date of Patent: *Apr. 28, 2020

(54) GENERIC ACCESS NETWORK (GAN) CONTROLLER SELECTION IN PLMN ENVIRONMENT

(71) Applicant: BlackBerry Limited, Waterloo (CA)

(72) Inventors: Adrian Buckley, Tracy, CA (US); George Baldwin Bumiller, Ramsey, NJ (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,377

(22) Filed: Jun. 11, 2018

(65) Prior Publication Data

US 2018/0359690 A1    Dec. 13, 2018

Related U.S. Application Data

(63) Continuation of application No. 14/452,759, filed on Aug. 6, 2014, now Pat. No. 9,998,984, which is a
(Continued)

(51) Int. Cl.
*H04W 36/00* (2009.01)
*H04W 48/18* (2009.01)
(Continued)

(52) U.S. Cl.
CPC .......... *H04W 48/18* (2013.01); *H04L 63/08* (2013.01); *H04L 63/0892* (2013.01); *H04W 36/0066* (2013.01); *H04W 60/005* (2013.01); *H04L 63/162* (2013.01); *H04W 12/00514* (2019.01); *H04W 12/06* (2013.01)

(58) Field of Classification Search
CPC ...................................................... H04W 48/18
See application file for complete search history.

(56) References Cited

U.S. PATENT DOCUMENTS 5,903,832 A    5/1999  Seppanen et al.
5,950,130 A    9/1999  Coursey
(Continued)

FOREIGN PATENT DOCUMENTS

CA    1279865    1/2001
CA    2503550    5/2004
(Continued)

OTHER PUBLICATIONS

"Unlicensed Mobile Access (UMA); Architecture (Stage 2)," UMA Architecture (Stage 2) R1 .0.1., Oct. 8, 2004, pp. 1-80.
(Continued)

*Primary Examiner* — Michael T Vu
(74) *Attorney, Agent, or Firm* — Fish & Richardson P.C.

(57) ABSTRACT

A method for network selection on a user equipment (UE) device and the UE device are shown. The user equipment device registers on a first network in a wide area cellular network (WACN) band and receives, from a wireless local area network (WLAN), a list of WACNs that support generic access network (GAN) capabilities. The user equipment device selects the WLAN if the first network is on the list.

19 Claims, 15 Drawing Sheets

Related U.S. Application Data continuation of application No. 11/264,548, filed on Nov. 1, 2005, now Pat. No. 8,843,995.

(60) Provisional application No. 60/624,314, filed on Nov. 2, 2004, provisional application No. 60/624,332, filed on Nov. 2, 2004.

(51) Int. Cl.
*H04L 29/06* (2006.01)
*H04W 60/00* (2009.01)
*H04W 12/06* (2009.01)
*H04W 12/00* (2009.01)

(56) References Cited

U.S. PATENT DOCUMENTS

| | | | |
|---|---|---|---|
| 5,978,673 A | 11/1999 | Alperovich et al. | |
| 5,999,811 A | 12/1999 | Moine | |
| 6,101,387 A | 8/2000 | Granberg et al. | |
| 6,119,003 A | 9/2000 | Kukkohovi | |
| 6,356,761 B1 | 3/2002 | Huttunen et al. | |
| 6,389,283 B1 | 5/2002 | Sanchez Herroro | |
| 6,799,038 B2 | 9/2004 | Gopikanth | |
| 6,909,705 B1 | 6/2005 | Lee et al. | |
| 6,938,155 B2 | 8/2005 | D'Sa et al. | |
| 6,947,405 B2 | 9/2005 | Pitcher et al. | |
| 6,961,569 B2 * | 11/2005 | Raghuram | H04W 48/16 455/414.1 |
| 7,047,036 B2 | 5/2006 | Shaheen | |
| 7,096,014 B2 | 8/2006 | Haverinen et al. | |
| 7,103,662 B2 | 9/2006 | Ray | |
| 7,224,677 B2 * | 5/2007 | Krishnamurthi | H04W 36/0033 370/328 |
| 7,295,540 B2 | 11/2007 | Joong | |
| 7,489,919 B2 | 2/2009 | Cheng | |
| 8,045,980 B2 | 10/2011 | Buckley et al. | |
| 8,369,852 B2 | 2/2013 | Buckley et al. | |
| 8,423,016 B2 | 4/2013 | Buckley et al. | |
| 8,843,995 B2 | 9/2014 | Buckley et al. | |
| 2002/0087674 A1 | 7/2002 | Guilford et al. | |
| 2002/0133534 A1 | 9/2002 | Forslow | |
| 2002/0147012 A1 | 10/2002 | Leung et al. | |
| 2002/0164984 A1 | 11/2002 | Thakker | |
| 2002/0176579 A1 | 11/2002 | Deshpande et al. | |
| 2002/0178355 A1 | 11/2002 | D'Sa et al. | |
| 2003/0119481 A1 | 6/2003 | Haverinen et al. | |
| 2003/0134650 A1 | 7/2003 | Sundar et al. | |
| 2003/0135626 A1 | 7/2003 | Ray et al. | |
| 2003/0172163 A1 | 9/2003 | Fujita et al. | |
| 2003/0216140 A1 | 11/2003 | Chambert | |
| 2004/0008646 A1 | 1/2004 | Park et al. | |
| 2004/0066756 A1 | 4/2004 | Ahmavaara et al. | |
| 2004/0066759 A1 * | 4/2004 | Molteni | H04L 41/048 370/329 |
| 2004/0077336 A1 | 4/2004 | Lauriol | |
| 2004/0087307 A1 | 5/2004 | Ibe et al. | |
| 2004/0095942 A1 | 5/2004 | Lung | |
| 2004/0105434 A1 | 6/2004 | Baw | |
| 2004/0116119 A1 | 6/2004 | Lewis et al. | |
| 2004/0116120 A1 | 6/2004 | Gallagher et al. | |
| 2004/0151136 A1 | 8/2004 | Gage | |
| 2004/0203792 A1 | 10/2004 | Shaheen | |
| 2004/0218587 A1 | 11/2004 | Kim et al. | |
| 2004/0218605 A1 | 11/2004 | Gustaffson et al. | |
| 2004/0230697 A1 | 11/2004 | Kiss et al. | |
| 2004/0266436 A1 | 12/2004 | Jaakkola et al. | |
| 2005/0038876 A1 | 2/2005 | Chaudhuri | |
| 2005/0041578 A1 | 2/2005 | Huotari et al. | |
| 2005/0077336 A1 | 4/2005 | Lammers et al. | |
| 2005/0094593 A1 | 5/2005 | Buckley | |
| 2005/0130661 A1 | 6/2005 | Aerrabotu | |
| 2005/0272466 A1 | 12/2005 | Haverinen et al. | |
| 2006/0077924 A1 | 4/2006 | Rune | |
| 2006/0077926 A1 * | 4/2006 | Rune | H04L 45/34 370/328 |
| 2006/0079274 A1 | 4/2006 | Gallagher et al. | |
| 2006/0094427 A1 | 5/2006 | Buckley et al. | |
| 2006/0095954 A1 | 5/2006 | Buckley et al. | |
| 2006/0114870 A1 | 6/2006 | Buckley et al. | |
| 2006/0114871 A1 | 6/2006 | Buckley et al. | |
| 2006/0116125 A1 | 6/2006 | Buckley et al. | |
| 2006/0168648 A1 | 7/2006 | Vank et al. | |
| 2012/0058762 A1 | 3/2012 | Buckley et al. | |
| 2014/0341191 A1 | 11/2014 | Buckley et al. | |

FOREIGN PATENT DOCUMENTS

| | | |
|---|---|---|
| CA | 2504855 | 5/2004 |
| CA | 2515819 | 8/2004 |
| CA | 2478008 | 3/2005 |
| CA | 2491560 | 7/2005 |
| CN | 1435068 | 8/2003 |
| EP | 1257141 | 11/2002 |
| EP | 1372350 | 12/2003 |
| EP | 2302972 | 3/2011 |
| JP | 2000-270360 | 3/1999 |
| JP | 2003-230167 | 8/2003 |
| JP | 2004-297357 | 10/2009 |
| JP | 2012-055009 | 3/2012 |
| KR | 10-2007-0064323 | 6/2007 |
| KR | 10-2007-0086856 | 8/2007 |
| KR | 10-2007-1086853 | 8/2007 |
| KR | 10-2007-0091176 | 9/2007 |
| WO | 1996/034504 | 10/1996 |
| WO | 1999/016267 | 4/1999 |
| WO | 2000/017769 | 3/2000 |
| WO | 2001/047316 | 6/2001 |
| WO | 2001/091382 | 11/2001 |
| WO | 2002/063900 | 8/2002 |
| WO | 2002/067563 | 8/2002 |
| WO | 2002/076133 | 9/2002 |
| WO | 2002/078265 | 10/2002 |
| WO | 2002/080607 | 10/2002 |
| WO | 2002/091783 | 11/2002 |
| WO | 2003/058996 | 7/2003 |
| WO | 2003/107698 | 12/2003 |
| WO | 2004/017172 | 2/2004 |
| WO | 2004/036770 | 4/2004 |
| WO | 2004/040931 | 5/2004 |
| WO | 2004/047476 | 6/2004 |
| WO | 2004/066707 | 8/2004 |
| WO | 2004/073338 | 8/2004 |
| WO | 2004/099919 | 11/2004 |
| WO | 2004/100576 | 11/2004 |
| WO | 2004/112346 | 12/2004 |
| WO | 2005/060292 | 6/2005 |
| WO | 2005/107169 | 10/2005 |
| WO | 2006/053420 | 5/2006 |
| WO | 2006/056069 | 6/2006 |
| WO | 2006/056070 | 6/2006 |
| WO | 2006/056071 | 6/2006 |

OTHER PUBLICATIONS

3GPP Technical Specification Group Core Network; Numbering Addressing and Identification; 3GPP TS 23.003 V6.0.0, Sep. 2004; 44 pgs.

3GPP TR 43.901 V6.0.0, 3rd Generation Partnership Project, Technical Specification Group GSM/EDGE Radio Access Network, Feasibility Study on Generic Access to A/Gb Interface (Release 6), Aug. 2004, pp. 1-36.

3GPP, Network Selection, Telecom Italia, S2-042477, TSG-SA2#41, Aug. 20, 2004, 3 pgs.

3GPP, Shared Network Support in Connected Mode, Approved V1 .0.0 of RAN3 Internal TR R3.012, TSGR3#30(02) 2271, Sep. 27, 2002, 16 pgs.

3GPP, Technical Specification Group GSM/EDGE Radio Access Network; Generic Access to the A/Gb interface; Stage 2, Release X, TS 43.xxx, V0.2.0, Oct. 29, 2004, 28 pgs.

(56) References Cited

OTHER PUBLICATIONS

3rd Generation Partnership Project Technical Specification Group Core Network 3GPP System to Wireless Local Area Network (WLAN) Interworking, V 6.0.0; Sep. 2004, 24 pgs.
3rd Generation Partnership Project Technical Specification Group GERAN Feasibility Study on Generic Access to A/ Gb Interface; Release 6, TR 43.901, V. 2.1.0, Aug. 2004, 33 pgs.
3GPP, 3rd Generation Partnership Project Technical Specification Group Services and System Aspects 3GPP System to Wireless Local Area Network (WLAN) Interworking, TS24.234, V6.2.0.; Sep. 2004, 97 pgs.
Ericsson, et al., Proposal for Stage 2 description for Generic Access to A/Gb interface, 3GPP TSG Geran #22 Meeting, GP-042394, (Generic Access to the A/Gb interface; Stage 2 (Release X), 3GPP TS 43. xxx V0.2.0 (Oct. 2004)), Nov. 8, 2004, 22 pgs.
Global System for Mobile Communications, 3GPP TS 44.318 V6.30 (Nov. 2005 Generic Access (GA) to theA/Gb interface; Mobile FA interface layer 3 specification (Release 6); dated 2005, 149 pgs.
Laine et al., "Network Models for Converged Fixed and Mobile Telephony," Technical Paper, Alcatel Telecommunications Review, Apr. 12, 2005, URL, Alcatel.com/atr (1049PC2) 8 pgs.
UMA Architecture Stage 2, R1.0.2 (Nov. 3, 2004), 80 pgs.
Alcatel et al., "Unlicensed Mobile Access (UMA) Architecture (Stage 2)," UMA Architecture (Stage 2) R1.0.0, Technical Specification, pp. 27-34, Jan. 9, 2004, 7 pages.
"3rd Generation Partnership Project; Technical Specification Group Core Network; 3GPP System to Wireless Local Area Network (WLAN) interworking; User Equipment (UE) to network protocols; Stage 3 (Release 6); 3GPP TS 24.234 v6.0.0," Sep. 2004, 24 pages.
Brazil Search Report issued in Brazilian Application No. PI0518060-0 dated Aug. 28, 2018, 6 pages.
Hearing Notice issued in Indian Application No. 1446/DELNP/2007 dated Mar. 12, 2019, 2 pages.

* cited by examiner

| PLMN via macro network [MCC+MNC] | Operator-controlled preferred PLMNs for GANC/I-WLAN access | User-controlled PLMNs for GANC/I-WLAN access | Forbidden PLMNs for GANC/I-WLAN access | 3GPP capability |
|---|---|---|---|---|
| | | PLMN1 | | Yes |
| | | | PLMN8 | |
| | | | | |
| PLMN10 | PLMN10 | PLMN10 | | Yes |
| | | | | |
| PLMN22 | | | PLMN22 | |
| | PLMN23 | | | Yes |
| | | | | |
| PLMN33 | | | PLMN33 | Yes |
| | | | | |
| | PLMN48 | | | |
| | | | | |
| | | | | |

| Operator-controlled preferred SSIDs for GANC/I-WLAN access — 950 | User-controlled SSIDs for GANC/I-WLAN access — 952 | Forbidden SSIDs for GANC/I-WLAN access — 954 |
|---|---|---|
| SSID1 {set of PLMNs} | | |
| SSID2 {set of PLMNs} | | |
| | SSID3 {set of PLMNs} | |
| | | SSID9 {set of PLMNs} |
| SSID10 {set of PLMNs} | SSID10 {set of PLMNs} | |
| | | |
| | | |
| SSID15 {set of PLMNs} | SSID15 {set of PLMNs} | |
| | | |
| SSID18 {set of PLMNs} | | |
| | SSID20 {set of PLMNs} | SSID20 {set of PLMNs} |
| | | |
| | | |

| List of WACNs (PLMNS) discovered via scanning in a first band (e.g., WLAN band) (with or without filters) List 1 | List of WACNs (PLMNS) discovered via scanning in a second band (e.g., cellular band) (with or without filters) List 2 | Set of WACNs (PLMNs) after correlating between the first two lists (with or without filters) |
|---|---|---|
| PLMN-a | | |
| PLMN-b | PLMN-b | PLMN-b |
| | | |
| | | |
| PLMN-j | | |
| | | |
| | PLMN-k | |
| | | |
| PLMN-m | PLMN-m | PLMN-m |
| | | |
| | PLMN-o | |
| | PLMN-p | |
| PLMN-r | | |

FIG. 10

GENERIC ACCESS NETWORK (GAN) CONTROLLER SELECTION IN PLMN ENVIRONMENT

PRIORITY UNDER 35 U.S.C. § 119(e) & 37 C.F.R. § 1.78

This nonprovisional patent application is a continuation of co-pending U.S. patent application Ser. No. 14/452,759, filed Aug. 6, 2014, which is a continuation of U.S. patent application Ser. No. 11/264,548, filed Nov. 1, 2005, now issued as U.S. Pat. No. 8,843,995, which claims priority based upon the following prior U.S. provisional patent application(s): (i) "NETWORK SELECTION IN GAN ENVIRONMENT," Application No.: 60/624,314, filed Nov. 2, 2004, in the name(s) of Adrian Buckley and George Baldwin Bumiller; and (ii) "GENERIC ACCESS NETWORK (GAN) CONTROLLER SELECTION IN PLMN ENVIRONMENT," Application No.: 60/624,332, filed Nov. 2, 2004, in the name(s) of Adrian Buckley and George Baldwin Bumiller, which is (are) hereby incorporated by reference.

CROSS-REFERECE TO RELATED APPLICATION(S)

This application discloses subject matter that is related to the subject matter of the following U.S. patent application(s): (i) "NETWORK SELECTION IN GAN ENVIRONMENT" application Ser. No.: 11/263,704, filed Nov. 1, 2005, now issued as U.S. Pat. No. 8,045,980 which is (are) hereby incorporated by reference.

FIELD OF THE DISCLOSURE

The present patent disclosure generally relates to communication networks. More particularly, and not by way of any limitation, the present patent application is directed to a scheme for controller discovery and selection by a user equipment (UE) device operable in a generic access network (GAN) space that may be interconnected to a wide area cellular network (WACN) space.

BACKGROUND

Wireless access networks have become a key element of a variety of telecommunications network environments. As to enterprise networks, they provide convenient access to network resources for workers carrying portable computers and mobile handheld devices, and for guests or temporary workers similarly equipped. They also provide a cost-effective alternative to relocating physical Ethernet jacks in environments where facilities are moved or changed frequently. In addition, wireless access points operable with diverse communication/computing devices are becoming ubiquitous in public environments such as, e.g., hotels, airports, restaurants, and coffee shops. With the increase in high-speed Internet access, the use of access point(s) in the users' homes is also envisioned and has started for other applications.

Concomitantly, several developments in the user equipment (UE) arena are also taking place to take advantage of the capabilities offered by wireless access networks. Of particular interest is the integration of cellular phones with the capability to interface with a wireless access network such as a wireless Local Area Network (WLAN). With such "dual mode" devices becoming available, it should be appreciated that some interworking mechanism between the cellular network and WLAN would be required so as to facilitate efficient handover of services from one type of network to the other.

BRIEF DESCRIPTION OF THE DRAWINGS

A more complete understanding of the embodiments of the present patent application may be had by reference to the following Detailed Description when taken in conjunction with the accompanying drawings wherein:

FIG. 9A depicts a plurality of PLMN-based lists that may be used in refining the network discovery/selection mechanism according to one embodiment;

FIG. 9B depicts a plurality of Service Set ID (SSID)-based lists that may be used in refining the network discovery/selection mechanism according to one embodiment;

FIG. 10 depicts a database structure having one or more PLMNs identified after correlating the PLMNs discovered in multiple modes;

DETAILED DESCRIPTION OF THE DRAWINGS

The present patent disclosure is broadly directed to a scheme for selecting a generic access network (GAN) controller by a user equipment (UE) device disposed in a network environment including a GAN. Responsive to a query request by the UE device, one or more IP addresses of GANC nodes are obtained, each node for accessing a particular Public Land Mobile Network (PLMN). The UE device then authenticates with at least one GANC node for obtaining access service to a PLMN coupled thereto.

In one aspect, a GANC selection method is disclosed which comprises: generating a Fully Qualified Domain Name (FQDN) by the UE device for transmission to a GAN; responsive to transmitting the FQDN, obtaining one or more Internet Protocol (IP) addresses from the GAN, each IP address corresponding to a GANC node operably coupled to a PLMN; and authenticating by the UE device with at least one GANC node for obtaining access service via the GAN to a PLMN operably coupled thereto.

In another aspect, a GANC selection system is disclosed which comprises: means associated with the UE device for generating a Fully Qualified Domain Name (FQDN) by the UE device for transmission to a GAN; means, operating responsive to the FQDN received at the GAN, for providing one or more IP addresses supported by the GAN, each IP address corresponding to a GANC node operably coupled to a PLMN; and means associated with the UE device for authenticating with at least one GANC node for obtaining access service via the GAN to a PLMN operably coupled thereto.

In a still further aspect, a UE device is disclosed for selecting a GANC node disposed in a network environment including a GAN. The UE device comprises: a logic module operable to generate a Fully Qualified Domain Name (FQDN) for transmission to the GAN; and a logic module, operable responsive to one or more IP addresses obtained from the GAN, each IP address corresponding to a GANC node operably coupled to a PLMN, for authenticating with at least one GANC node for obtaining access service via the GAN to a PLMN operably coupled thereto.

Figure 1:
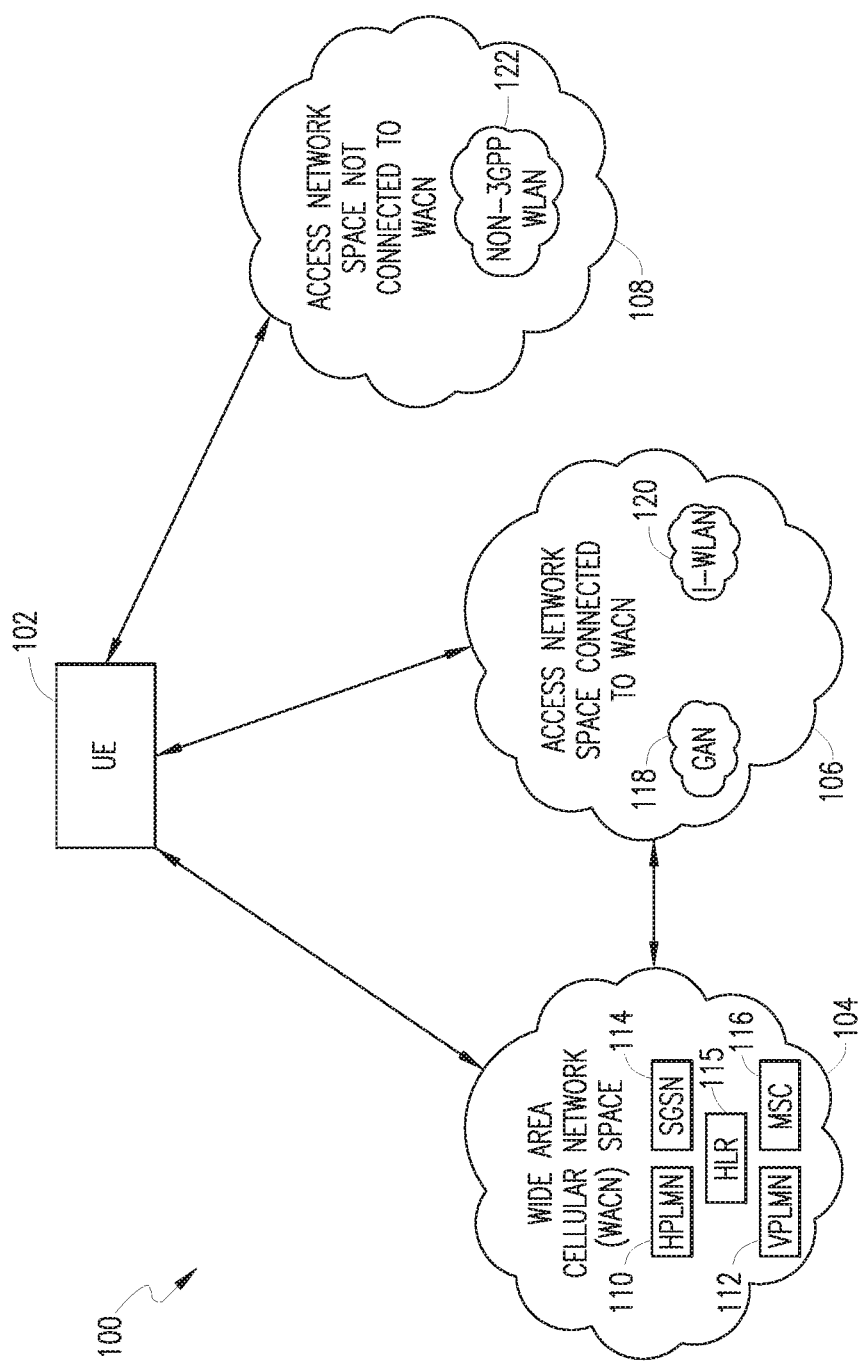
FIG. 1 depicts a generalized network environment wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized network environment 100 wherein an embodiment of the present patent disclosure may be practiced. A user equipment (UE) device 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation. For example, UE device 102 may operate in the cellular telephony band frequencies as well as wireless Local Area Network (WLAN) bands, or possibly in the WLAN bands alone. Further, other bands in which the UE device could operate wirelessly may comprise Wi-Max bands or one or more satellite bands. Additionally, the network environment 100 is comprised of three broad categories of communication spaces capable of providing service to UE device 102. In wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of home networks (i.e., home PLMNs or HPLMNs) 110, visited networks (i.e., VPLMNs) 112, each with appropriate infrastructure such as Home Location Register (HLR) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise networks selected from at least one of an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any $3^{rd}$ Generation Partnership Project (3GPP)-compliant network (e.g., 3GPP or 3GPP2), a Universal Terrestrial Radio Access Network (UTRAN), all operating with well known frequency bandwidths and protocols.

Further, UE device 102 is operable to obtain service from an access network (AN) space 106 that is connected to the WACN space 104. In one implementation, the AN space 106 includes one or more generic access networks (GANs) 118 as well as any type of WLAN arrangements 120. GAN 118, described in additional detail below, is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard, OpenAir standard, and the Bluetooth standard.

In one embodiment, interfacing between the WACN and AN spaces may be effectuated in accordance with certain standards. For instance, GAN 118 may be interfaced with a PLMN core using the procedures set forth in the 3GPP TR 43.901 and 3GPP TS 43.xxx documents as well as related documentation. Likewise, WLAN 120 may interfaced with a PLMN core using the procedures set forth in the 3GPP TS 22.234, 3GPP TS 23.234 and 3GPP TS 24.234 documents as well as related documentation, and may therefore be referred to as an Interworking WLAN (I-WLAN) arrangement.

Additionally, there may exist an access network (AN) space 108 not interfaced to the WACN space 104 that offers short-range wireless connectivity to UE device 102. For instance, AN space 108 may comprise WLANs 122 offering non-3GPP services, such as communications over "public" access points (hotels, coffee shops, bookstores, apartment buildings, educational institutions, etc., whether free or for fee), enterprise access points, and visited (other enterprise) access points where the user may not be a member of that enterprise but is allowed at least some services.

Given the mosaic of the network environment 100 in which UE device 102 may be disposed, it is desirable that a vertical handover mechanism exists such that the user can engage in a call as it moves from a PLMN's radio access network (RAN) to GAN (i.e., handover in) or from GAN to the PLMN's RAN (i.e., handover out). In order to facilitate such functionality as well as to customize and enhance the overall user experience associated therewith, the present patent disclosure provides a suite of network discovery and selection procedures operable with UE device 102 that involve one or more correlation and filtering schemes such that a more customizable handover call behavior can seamlessly take place in the generalized network environment 100. To formalize the teachings of the present disclosure, reference is now taken to FIG. 2 wherein an exemplary embodiment of a network environment 200 is shown that is a more concrete subset of the generalized network environment 100 illustrated in FIG. 1. As depicted, UE device 102 is operably disposed for discovering a set of PLMNs that allow access via conventional RAN infrastructure in addition to having connectivity with one or more GANs accessible to UE device 102. By way of example, GAN-1 202-1 through GAN-N 202-N, which are now generalized for purposes of the present patent disclosure to also include any type of WLAN and/or I-WLAN arrangements (known or heretofore unknown), are operable to be discovered by UE device. A GAN may support connectivity to one or more PLMNs, or none at all, which can include VPLMNs 204-1 through 204-M as well as HPLMNs (e.g., HPLMN 206) with respect to UE device 102. Where GAN-PLMN connectivity is supported, which PLMNs behind a particular GAN are visible to UE device 102 may depend on a number of commercial factors, e.g., contractual arrangements between GAN operators and PLMN operators. As illustrated, GAN-1 202-1 supports connectivity to VPLMN-1 204-1 and VPLMN-2204-2. Likewise, GAN-2 202-1 supports connectivity to VPLMN-M 204-M as well as to HPLMN 206. On the other hand, GAN-N 202-N has no connectivity to the wide area PLMNs.

As is well known, each of the wide area cellular PLMNs may be arranged as a number of cells, with each cell having sectors (e.g., typically three 120-degree sectors per base station (BS) or cell). Each individual cell may be provided with a cell identity, which can vary depending on the underlying WACN technology. For example, in GSM networks, each cell is provided with a Cell Global Identification (CGI) parameter to identify them. A group of cells is commonly designated as a Location Area (LA) and may be identified by an LA Identifier (LAI). At the macro level, the PLMNs may be identified in accordance with the underlying cellular technology. For example, GSM-based PLMNs may be identified by an identifier comprised of a Mobile Country Code (MCC) and Mobile Network Code (MNC). Analogously, The CDMA/TDMA-based PLMNs may be identified by a System Identification (SID) parameter. Regardless of the cellular infrastructure, all cells broadcast the macro level PLMN identifiers such that a wireless device (e.g., UE device 102) wishing to obtain service can identify the wireless network.

Figure 3:
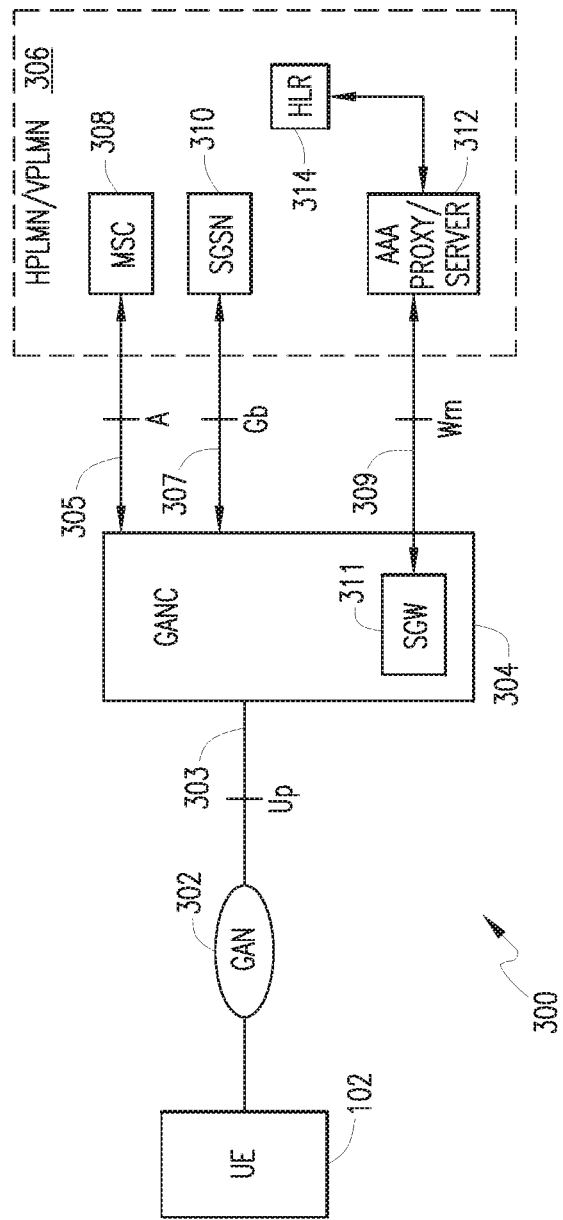
FIG. 3 depicts a functional block diagram of a network system where a wide area cellular network (WACN) such as a Public Land Mobile Network (PLMN) is accessible through a generic access network (GAN) and associated controller (GANC)

FIG. 3 depicts a functional block diagram of an exemplary network system 300 where a wide area cellular PLMN 306 is accessible to UE device 102 through a GAN 302 and associated controller (GANC) 304. Essentially, in the embodiment shown, GAN 302 is operable as a broadband IP-based access network providing access to the well known A/Gb interfaces of PLMN 306, wherein GANC 300 is a network node coupled to GAN 302 via a Up reference point interface 303. As provided in applicable 3GPP specification documents, the Up reference point 303 defines the interface between GANC 304 and UE device 102. Where the GAN is operable to co-exist with the GSM/EDGE RAN (GERAN) infrastructure, it interconnects to the core PLMN via the same A/Gb interfaces used by a standard GERAN Base Station Subsystem (BSS) network element. Accordingly, the functionality of GANC 304 includes necessary protocol interworking so as to emulate the functionality of the GERAN BSS (not shown in this FIGURE). The A-interface 305 defines the interface for GSM-based circuit-switched (CS) services and is disposed between GANC 304 and an MSC 308 of PLMN 306. The Gb-interface 307 defines the interface for GPRS-based packet-switched (PS) services and is disposed between GANC 304 and an SGSN 310 of PLMN 306. A Security Gateway (SGW) 311 may also be included in GANC 304 that is interfaced via a Wm reference point 309 (as defined by 3GPP TS 23.234) with an Authentication, Authorization and Accounting (AAA) proxy/server node 312 disposed in PLMN 306, wherein an HLR 316 is operably coupled to AAA node 312.

In operation, GANC 304 appears to the core PLMN 306 as a GERAN BSS network element by mimicking the role of the Base Station Controller (BSC) in the GERAN architecture as seen from the perspective of the A/Gb interfaces. Accordingly, PLMN 306 to which GANC 304 is connected is unaware of the underlying access mechanism being supported by GANC, which is different from the radio access supported by the BSC. As alluded to before, GAN 302 disposed between generic access (GA)-enabled UE device 102 and GANC 304 may be effectuated by a suitable broadband IP network. The overall functionality provided by GANC 304 includes the following:

- User plane CS services that involve interworking CS bearers over Up interface to CS bearers over A-interface, including appropriate transcoding of voice to/from UE and PCM voice from/to the MSC.
- User plane PS services that involve interworking data transport channels over Up interface to packet flows over Gb interface.
- Control plane functionality including: (i) SGW for the set-up of secure tunnel with UE for mutual authentication, encryption and data integrity; (ii) registration for GAN service access and providing system information; (iii) set-up of GAN bearer paths for CS and PS services (e.g., establishment, management, and teardown of signaling and user plane bearers between UE the GANC); and (iv) GAN functional equivalents to GSM Radio Resource (RR) management and GPRS Radio Link Control (RLC) such as for paging and handovers.

Figure 4A:
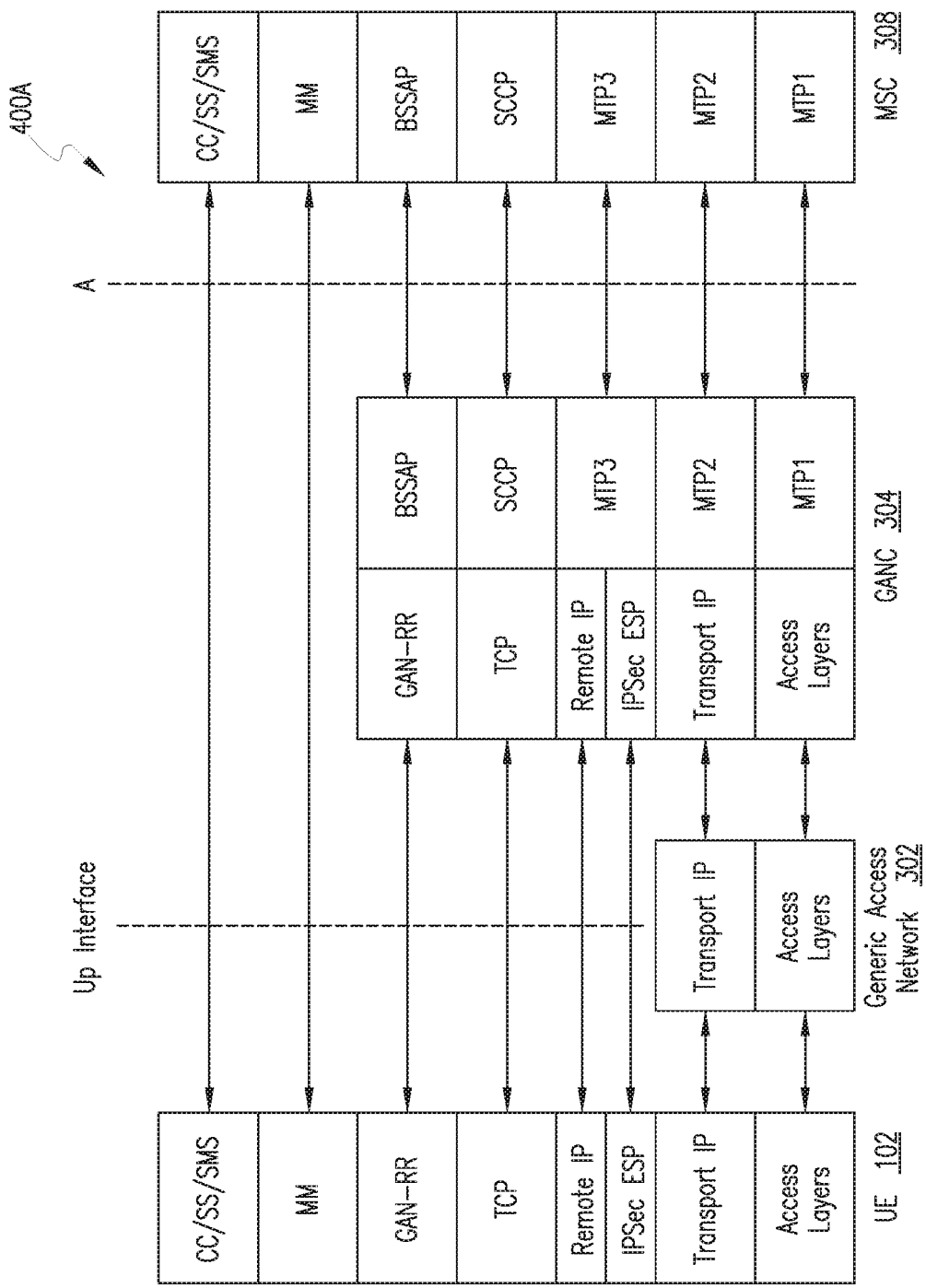
FIG. 4A depicts an exemplary embodiment of a circuit-switched (CS) protocol stack operable with the network system shown in FIG. 3.
Figure 4B:
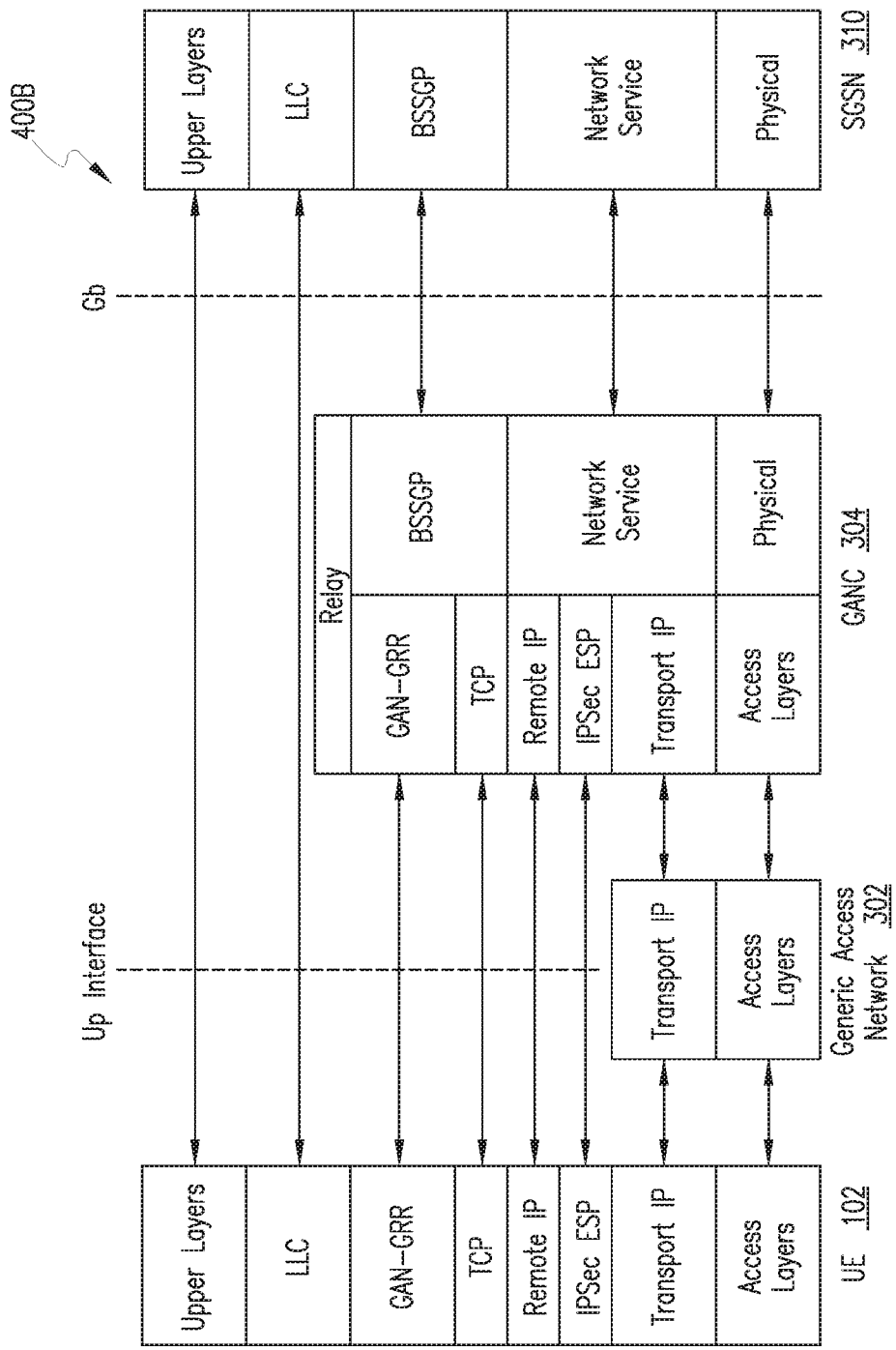
FIG. 4B depicts an exemplary embodiment of a packet-switched (PS) protocol stack operable with the network system shown in FIG. 3.

FIG. 4A depicts an exemplary embodiment of a protocol stack 400A operable with the CS domain signaling plane associated with the network system 300 shown in FIG. 3. Likewise, FIG. 4B depicts an exemplary embodiment of a protocol stack 400B operable with the PS domain signaling plane associated with network system 300. Additional details regarding generic access to the A/Gb interfaces and associated architecture may be found in the applicable 3GPP specifications identified in the U.S. provisional patent applications that have been referenced and incorporated hereinabove.

Figure 2:
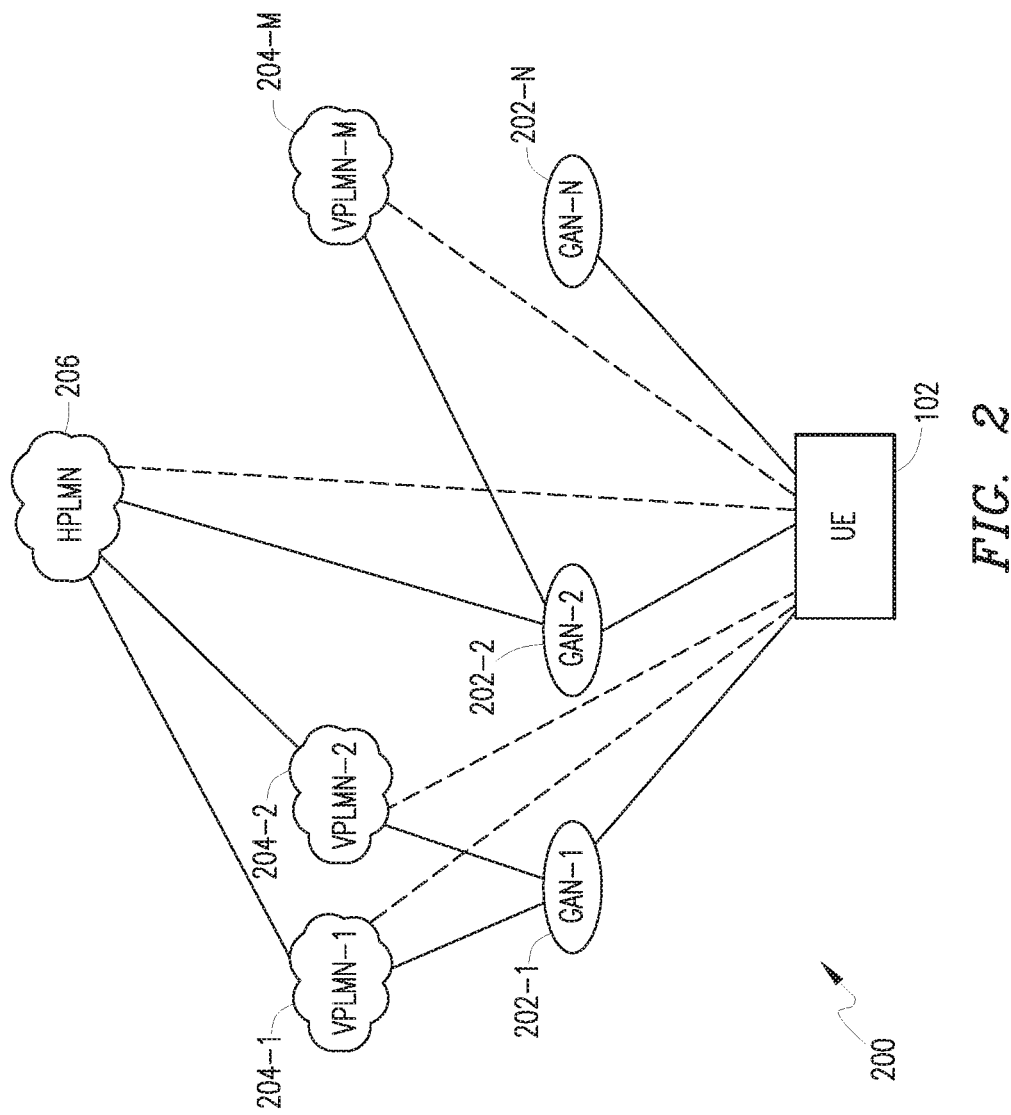
FIG. 2 depicts an exemplary embodiment of a network environment where a user equipment (UE) device is operably disposed for network discovery and selection in accordance with the teachings of the present patent disclosure.
Figure 5A:
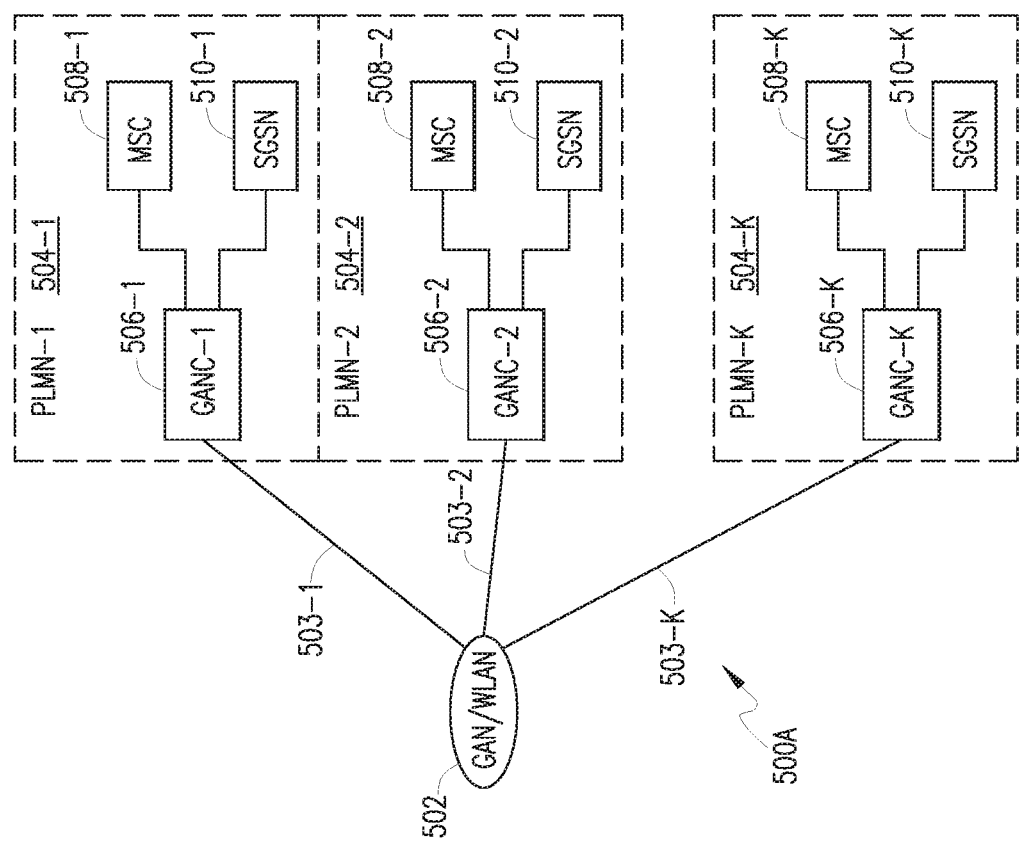
FIG. 5A depicts a network arrangement where an access network (GAN or Wireless LAN) is operable to connect to a plurality of PLMNs according to one embodiment wherein each PLMN is served by a corresponding GANC.

It should be apparent to those skilled in the art that given the mosaic of various GANs/WLANs and PLMNs provided within a generalized network environment such as the network environments described hereinabove with respect to FIGS. 1 and 2, a number of GAN/GANC configurations are possible from the perspective of providing access between a UE device and the available WACNs (i.e., PLMNs). FIG. 5A depicts a network arrangement 500A where a single access network (AN) 502 is operable to connect to a plurality of PLMNs 504-1 through 504-K according to one embodiment, wherein each PLMN is served by a corresponding GANC. By way of illustration, AN 502 may be generalized as a GAN which can be a WLAN operable with the GANC protocols described above, wherein a plurality of Up interfaces 503-1 through 503-K are supported for coupling to the GANCs. Reference numerals 506-1 through 506-K refer to a plurality of separate GANC nodes, each for interfacing with a particular PLMN associated therewith, wherein MSCs 508-1 through 508-K and SGSNs 510-1 through 510-K are illustrative of respective PLMN's infrastructure. One skilled in the art should recognize that although each PLMN is provided with a SGSN node, it is not a requirement for purposes of the present disclosure, and PLMNs 504-1 through 504-K may be implemented in accordance with different wide area cellular technologies, protocols and standards.

Figure 5B:
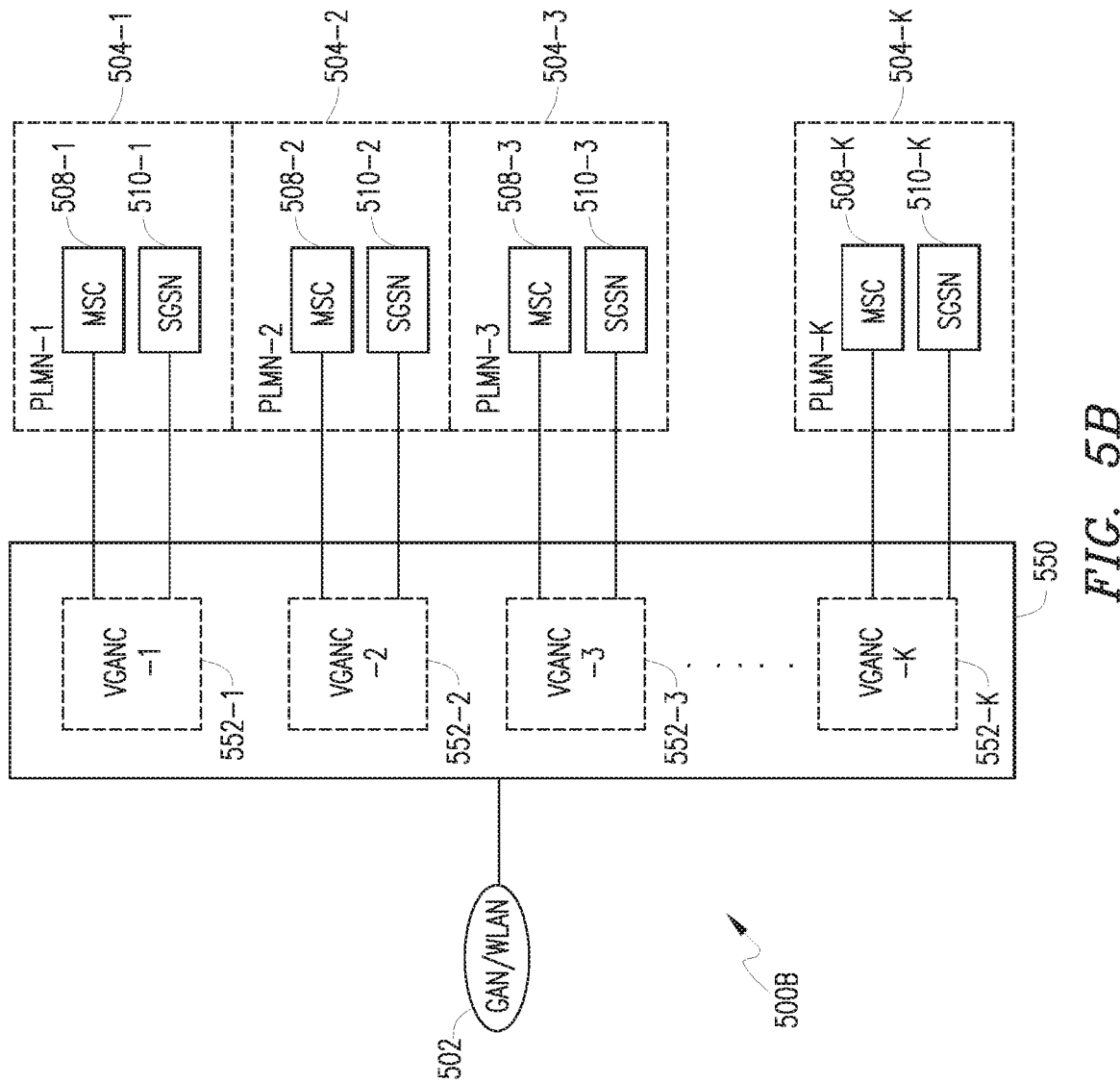
FIG. 5B depicts a network arrangement where an access network (GAN or Wireless LAN) is operable to connect to a plurality of PLMNs according to one embodiment wherein a plurality of virtual GANC partitions on a single GANC are operable to serve the corresponding PLMNs.

Referring now to FIG. 5B, depicted therein is an alternative network arrangement 500B where AN 502 (GAN or Wireless LAN) is operable to connect to the plurality of PLMNs 504-1 through 504-K via a single physical GANC 550 that supports a plurality of virtual GANC partitions 552-1 through 552-K. Each virtual GANC (VGANC) is independently operable to provide the requisite A/Gb interfacing functionality with respect to a corresponding PLMN. Accordingly, there is one logical GANC per PLMN that it connects to. Such a deployment may be used where the PLMNs supporting the WLAN connectivity do not see the need to own and operate their own GANC.

Based on the foregoing discussion, it should be appreciated that the GAN architecture provides a generalized framework for interworking WLANs with 3GPP-compliant WACNs by utilizing existing protocols, e.g., GPRS, whereby little or no adaptation or standardization work is required to be performed in the core. This allows for services to be handed over from a GAN/WLAN to a 3GPP-compliant WACN and vice versa, keeping the signaling and user plane traffic intact. However, as CS-switched protocols and GPRS protocols (Logical Link Control or LLC and Sub-Network Dependent Convergence Protocol or SNDCP) are used, the GAN/WLAN that is chosen must be able to reach an MSC/SGSN that is in the same PLMN as the MSC/SGSN used to terminate the GAN/WLAN traffic. To further complicate matters, a GAN/WLAN could connect to many PLMNs each having a separate, independently discoverable GANC node as described hereinabove. When a user encounters such a GAN/WLAN environment, there is currently no standardized procedure to define the selection of a particular GANC. As a consequence, a number of potential issues arise wherein the overall user experience as well as call handover behavior may be negatively impacted. For instance, if a GA-compliant UE device that operates in dual mode (i.e., two different technologies, each preferably in a separate band, for example) discovers a macro PLMN or WACN and subsequently chooses a GANC that belongs to a different WACN, handover between the AN and WACN spaces would not work. Such issues may also arise in network arrangements where a single GANC is partitioned to support a number of independently discoverable VGANC partitions.

Further, because of various levels of technology penetration and deployment in different regions and countries, additional complexities can arise where the AN and WACN spaces are to be interfaced using the GAN/WLAN approach. For example, a GA-compliant UE device may find itself in an area where there is no WACN coverage but there is WLAN coverage. If one or more WLANs are based on the I-WLAN approach rather than the GAN architecture, it is preferable that the UE differentiate between GAN and I-WLAN due to the differences in various control processes, e.g., registration, de-registration, etc., in addition to whatever service differences that may exist between them. For purposes of highlighting the scope of the present patent disclosure, some of the user experience-related issues are set forth below.

- The UE is not currently registered on a WACN. Here the UE cannot check the cellular band signals to determine the country it is in (i.e., MCC is unknown) to select the best or optimal provider. Although HPLMN is usually selected first, VPLMN preference may depend on location (e.g., country). In this situation, the UE may not know which VPLMN it prefers to connect to when it is examining the available GAN/WLANs.
- The operator's "Preferred PLMN" list on the Subscriber Identity Module (SIM) or Removable user Identity Module (RUIM) associated with the user does not take into account the UE's need for PS data services (e.g., GPRS capability) or other services such as Unlicensed Mobile Alliance (UMA) services. Such a situation may arise where the PLMN list is based only on CS voice roaming agreements and, as a result, the user may not be able to use email and other data services. One skilled in the art will note that such an issue can arise whether or not GAN or I-WLAN is used.
- Some or all of the operator-controlled lists for PLMNs may not be up-to-date, or particular entries for the country the UE is operating in may not be current.
- Because it takes up capacity to update lists over the cellular band, the HPLMN may wish to update lists during off-hours or when the UE is connected over I-WLAN or GAN.
- When there are no WACN signals to allow the UE to determine the MCC, the availability of AGPS (Assisted Global Positioning System) in the UE, or a (manual) user input, as well as recent (i.e., time-stamped) information on WACN MCC may be helpful.
- The case of operation close to country border(s) may result in the UE obtaining signals from more than one MCC, enabling user choice or "least cost" choice.

Those skilled in the art should recognize that the list set forth above is purely illustrative rather than limiting. It is envisaged that upon reference hereto various related problems may become apparent with respect to user experience and call behavior in the context of interfacing between GAN/WLAN and PLMN spaces.

For purposes of the present disclosure, the GA-capable UE may operate in either Automatic or Manual mode with certain differences in network discovery and selection procedures, although the particular features and capabilities of the two may vary depending on the applicable specification(s) as well as any modifications and changes that may be made to them. In general, the Manual mode allows the user to do more detailed selection/filtering of the available PLMNs, the bearer(s) to be used, and potentially even of the method to be used when using WLAN or other unlicensed radio technology (i.e., I-WLAN, GAN, or just a connection through the WLAN to the PLMN).

Figure 6:
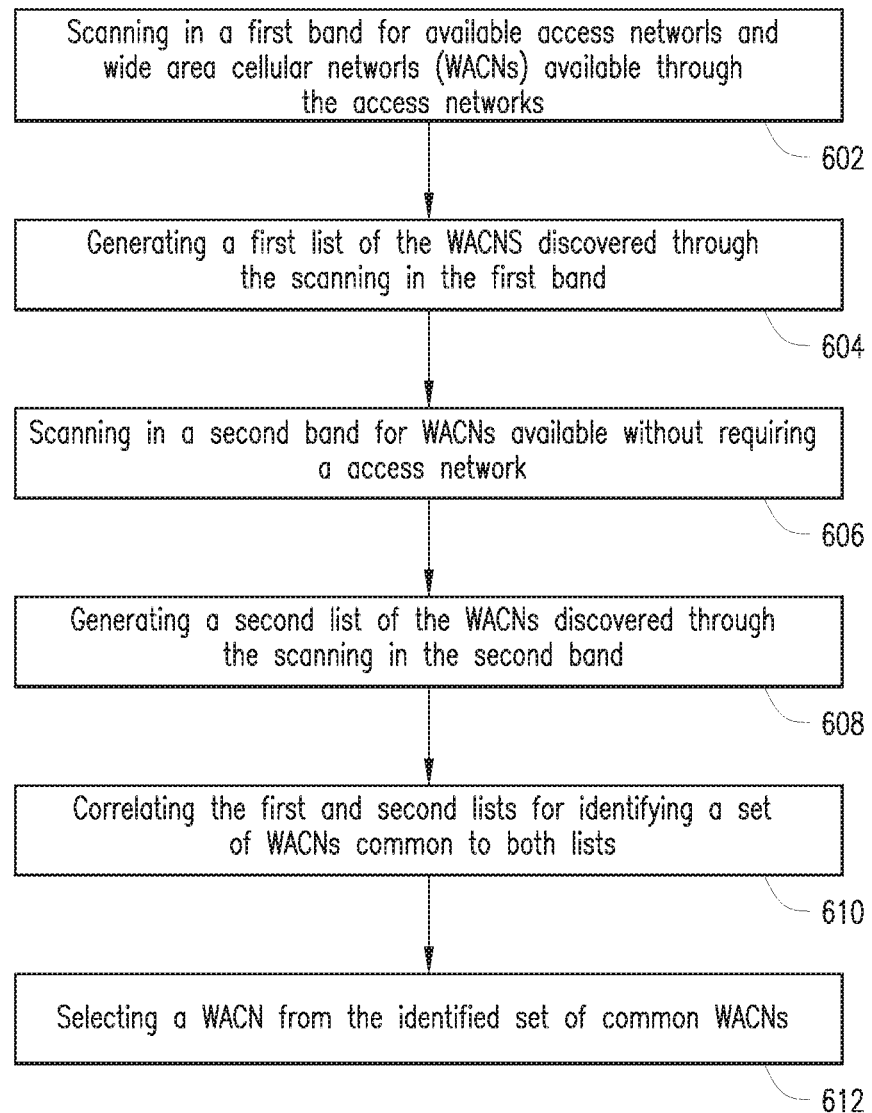
FIG. 6 is a flowchart of a network discovery and selection method according to one embodiment.

First, a generalized network discovery and selection scheme will be presented. Additional embodiments, features, and refinements will be discussed thereafter which broadly address the various issues identified above in the context of interfacing between GAN/WLAN and PLMN spaces. Referring now to FIG. 6, shown therein is a flowchart of a generalized network discovery and selection method according to one embodiment wherein a dual mode UE device is disposed in a network environment comprising a GAN/WLAN space as well as a WACN space. As illustrated, upon turning on power, the UE scans in a first band for available access networks and WACNs available through the access networks (block 602). A first list of the WACNs discovered through the scanning in the first band is then generated (block 604) for storing, either within SIM/RUIM or in memory provided with the UE device. Scanning in the second band may take place, either after scanning in the first band, before scanning in the first band, or substantially simultaneously in parallel with scanning in the first band, for all WACNs available without requiring an access network (block 606). Based on the results obtained in the scanning in the second band, a second list of WACNs is generated (block 608). As alluded to hereinabove, in one embodiment, WACNs may be identified by their [MCC;MNC] combinations. Also, additional features such as identifying whether a particular WACN in either of the lists is GPRS-capable may also be provided. Thereafter, a correlation is made between the first and second lists for identifying a set of WACNs common to both lists (block 610). A particular WACN may then be selected from the identified set (block 612), wherein the selection may be dependent upon certain selection criteria and filters such as Forbidden PLMN lists, Priority PLMN lists, and the like. In a further implementation, the UE could also list PLMNs that only provide WACN and/or WAN coverage.

It should be realized that scanning operations set forth above may be performed via active scanning or passive scanning methods. Also, the first and second bands described above are merely illustrative of the distinctive bands of respectively associated with WLANs and PLMNs, or vice versa, although there may be more than one band operable with WLANs and/or with PLMNs. In one instance, one of the first and second bands may comprise a frequency band selected from the group consisting of 450 MHz, 850 MHz, 900 MHz, 1800 MHz, 1900 MHz, 2100 MHz, or any satellite bands, whereas the other frequency band could be any band other than those provided in the foregoing group.

Those skilled in the art should recognize that the generalized network selection mechanism set forth above may be modified in a number of ways depending on whether the UE device is in Automatic or Manual mode, if the device is currently registered on a PLMN, desired level of user control, available selection filters, etc. Also, although the first and second bands have been described as the frequency bands operable with WLANs and WACNs, respectively, such description is solely for illustration and the band designations and scanning operations may therefore be reversed in other embodiments. Because of the variety of scenarios and options possible within the broad scheme of the network discovery and selection scheme of the present disclosure, a narrative account thereof will be presented prior to providing specific exemplary flowchart embodiments therefor.

I. Automatic Mode—Not currently Registered on PLMN

Here the UE is dual mode capable and when the UE finds a PLMN, it stores the network's identity [MCC, MNC] in memory or SIM/RUIM, until no more PLMNs can be found. As a further variation, in addition to storing the [MCC, MNC] combinations of all discovered PLMNs, the UE is capable of storing if a particular PLMN is GPRS capable or not. Preferably, in the case of finding the HPLMN, no further scanning may take place.

1. Option A a) Network discovery: The UE performs network discovery procedures for WLAN as defined in current 3GPP TS 23.234 and 3GPP TS 24.234 specifications (incorporated by reference herein). If the GAN/WLAN finds a Service Set ID (SSID) that it knows is the HPLMN, the UE authenticates with that GAN/WLAN using the Root Network Access Identifier (NAI). Otherwise, the UE performs network discovery as specified in the 3GPP TS 23.234 and 3GPP TS 24.234 specifications.

b) Network selection: The UE then correlates the found PLMNs (identified by [MCC, MNC] combinations) that have been stored and those that are supported on the GAN/WLANs. Using this correlated information, the UE registers on a PLMN that is available by the macro cellular network (i.e., WACN) procedures and via GAN/WLAN. In one embodiment, of those PLMNs that fit this condition, the PLMN lists that are currently defined for I-WLAN network selection may be used. As a further variation, however, it is possible to configure in the UE that those PLMNs supporting the GPRS service capability to have a higher preference than PLMNs that only support voice service.

2. Option B

In addition to the SSID lists defined in the 3GPP specifications for I-WLAN access, extra SSID/PLMN lists and associated filtering criteria can be stored so that the UE is not only aware of the WLANs that support GAN access, but a mechanism is provided thereby to speed up network selection as well as optimize/customize the user experience. By way of illustration, the following new lists may be defined:

5 Operator-controlled Preferred SSIDs for GANC access;

5 User-controlled SSIDs for GANC access;

5 Forbidden SSIDs for GANC access;

5 Operator-controlled Preferred PLMNs for GANC access;

5 User-controlled PLMNs for GANC access;

5 Forbidden PLMNs for GANC access;

wherein the priority of the SSID and PLMN is dictated by its position in the list.

a) Network discovery: The UE performs network discovery procedures for WLAN as defined in current 3GPP TS 23.234 and 3GPP TS 24.234 specifications; however the discovery procedures are modulated in conjunction with one or more of the new lists and filters defined above. An exemplary embodiment of such modulation is set forth below in particular reference to FIG. 7. As a further variation, if the new lists are not available or stored in the UE, the lists as currently defined in 3GPP TS 23.234 and 3GPP TS 24.234 specifications may be used. Thereafter, if the GAN/WLAN finds an SSID that it knows is the HPLMN, the UE authenticates with that GAN/WLAN using the Root NAI. Otherwise, the UE continues with network discovery as set forth in Option A, where the procedures set forth in the 3GPP TS 23.234 and 3GPP TS 24.234 specifications may be used.

b) Network selection: Similar to Option A, the UE employs correlation techniques with respect to the PLMNs discovered using macro network discovery (in cellular band) and those that are supported on the GAN/WLANs. Using this correlated information, the UE can register on a PLMN that is available by the macro cellular network and via WLAN. Of those PLMNs that satisfies this criterion, the new lists that are currently defined above in Option B may be used to further refine the selection process. Once again, PLMNs that support GPRS services or other UMA-compliant services may be designated to have a higher preference than PLMNs that only support voice service.

3. Option C

As a further variation, the SSID/PLMN lists as currently defined in 3GPP TS 23.234 and 3GPP TS 24.234 specifications may be appropriately modified such that there is an indication or flag next to an SSID/PLMN in a list that indicates if that SSID and or PLMN supports GAN architecture. Those skilled in the art should recognize that such a procedure allows network selection to be accelerated.

4. Option D

By way of a still further variation, if the UE is unable to receive any or all cellular networks (e.g. in a building without cellular signal penetration or microcells, or with a microcell of only one cellular network), it may use the most recent cellular networks (depending on the time interval since they were scanned). Alternatively, once the MCC is available, those MNCs that operate in that MCC may be selected from information previously stored in the UE.

II. Manual Mode—Not Currently Registered on PLMN

Similar to the Automatic Mode procedures discussed above, the UE scans for all PLMNs according to applicable 3GPP specifications and stores all identified PLMNs using the [MCC, MNC] combinations. The UE also scans for all GAN/WLANs and perform network discovery according to current 3GPP procedures by sending an Alternative NAI to each SSID and retrieving a list of PLMNs supported on the SSID. Logic provided with the UE device is operable to apply correlation techniques with respect to the found PLMNs via GAN/WLAN and the PLMNs discovered via macro cellular network scanning. PLMNs that can be found both via cellular scan and GAN/WLAN network discovery are then presented via a display to the user. An another alternative embodiment may involve indicating to the user if a PLMN found also supports additional service features and capabilities, e.g., UMA-based services. Optionally, the selection logic of the UE device may provide for an indication or flag as to whether the displayed PLMNs support GANC access, GAN handover, or both.

Further, several implementation options are available in Manual Mode similar to the options discussed above with respect to Automatic Mode. Accordingly, SSID lists defined in the 3GPP specifications for I-WLAN access may be suitably modified to provide indications of additional capabilities such as GPRS services, UMA-based services, GANC capability, etc. Also, similar to the options previously described, additional SSID/PLMN lists and associated filtering criteria may also be provided in Manual Mode which may be used in conjunction with network discovery procedures as explained hereinabove in detail.

Figure 7:
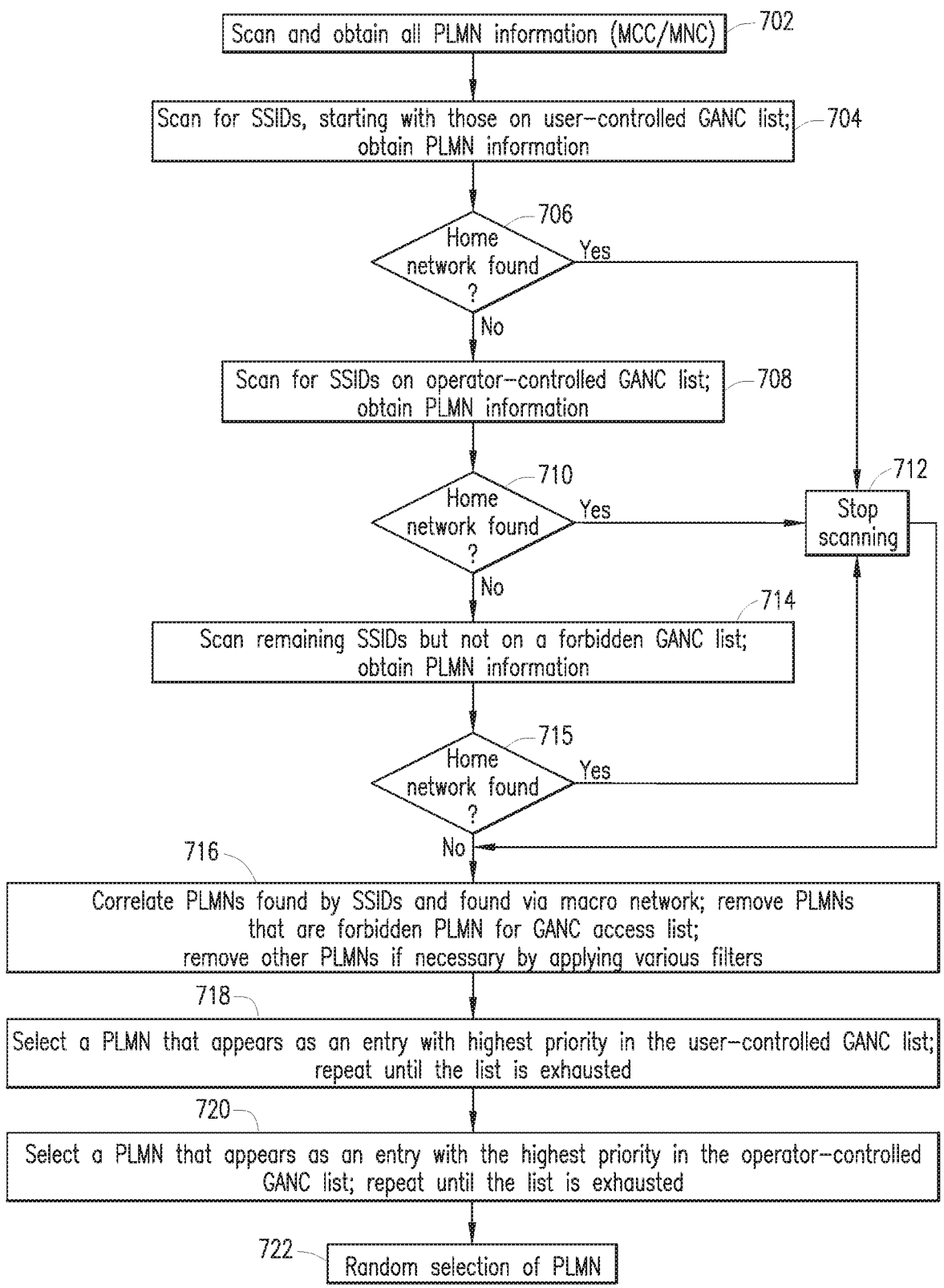
FIG. 7 is a flowchart of a network discovery and selection method according to another embodiment.

Referring now to FIG. 7, depicted therein is a flowchart of a network discovery and selection method operable with a UE device according to an embodiment. At block 702, the UE scans and obtains all PLMN information (i.e., [MCC, MNC] combinations) in the WACN bands. The UE is also operable to scan for SSIDs in the GAN/WLAN bands in order to obtain the PLMNs supported by each SSID (block 704). In one implementation, the scanning may start with the SSIDs in a user-controlled Preferred SSID list for GANC access. If a home network is found (decision block 706), the scanning operation stops (block 712). Thereafter, the UE scans for SSIDs on an operator-controlled Preferred SSID list for GANC access in order to obtain the PLMN information associated with each SSID (block 708). Again, if the home network is found (decision block 710), scanning is stopped (block 712). In a still further scanning process involving the GAN/WLAN bands, the UE device scans for those SSIDs not on a Forbidden SSID list for GANC access so as to discover whatever PLMNs supported by each individual SSID (block 714). Once again, this process is terminated (block 712) if a home network is found (decision block 715).

It should be apparent to one of ordinary skill in the art that the preceding scanning operations may be further modified by adding extra filtering criteria that are user-controlled, operator-controlled, or both. Also, the order of scanning operations may be changed as well. Upon discovering the PLMNs in the WACN bands (i.e., macro cellular network discovery) as well as those supported by various SSIDs under different filtering schemes (which may be referred to as scanning filters), network selection logic provided with the UE is operable to apply a suite of correlation techniques and selection filters to select a PLMN. Once again, it should be appreciated that application of such correlations and selection filters may be implemented in a number of ways.

Continuing to refer to FIG. 7, at block 716, the PLMNs found via macro network discovery and those supported by SSIDs scanned are correlated to find a set of common PLMNs. Filters such as removing PLMNs that are on any "forbidden" lists (e.g., Forbidden PLMNs for GANC access), et cetera, are then used to generate a "short list" of the PLMNs from the common set that may be subjected to further selection/priority criteria (selection filters). For example, at block 718, a selection may be made of a PLMN that appears as an entry with the highest priority in the user-controlled Preferred PLMN list for GANC access, which may be repeated until the list is exhausted. Likewise, a selection may be made of a PLMN that appears as an entry with the highest priority in the operator-controlled Preferred PLMN list for GANC access, which may also be repeated until the list is exhausted (block 720). As before with the application of scanning filters, the selection filters and their order may be modified in a number of ways. Finally, a random PLMN selection may be provided as a default mechanism (block 722).

Figure 8:
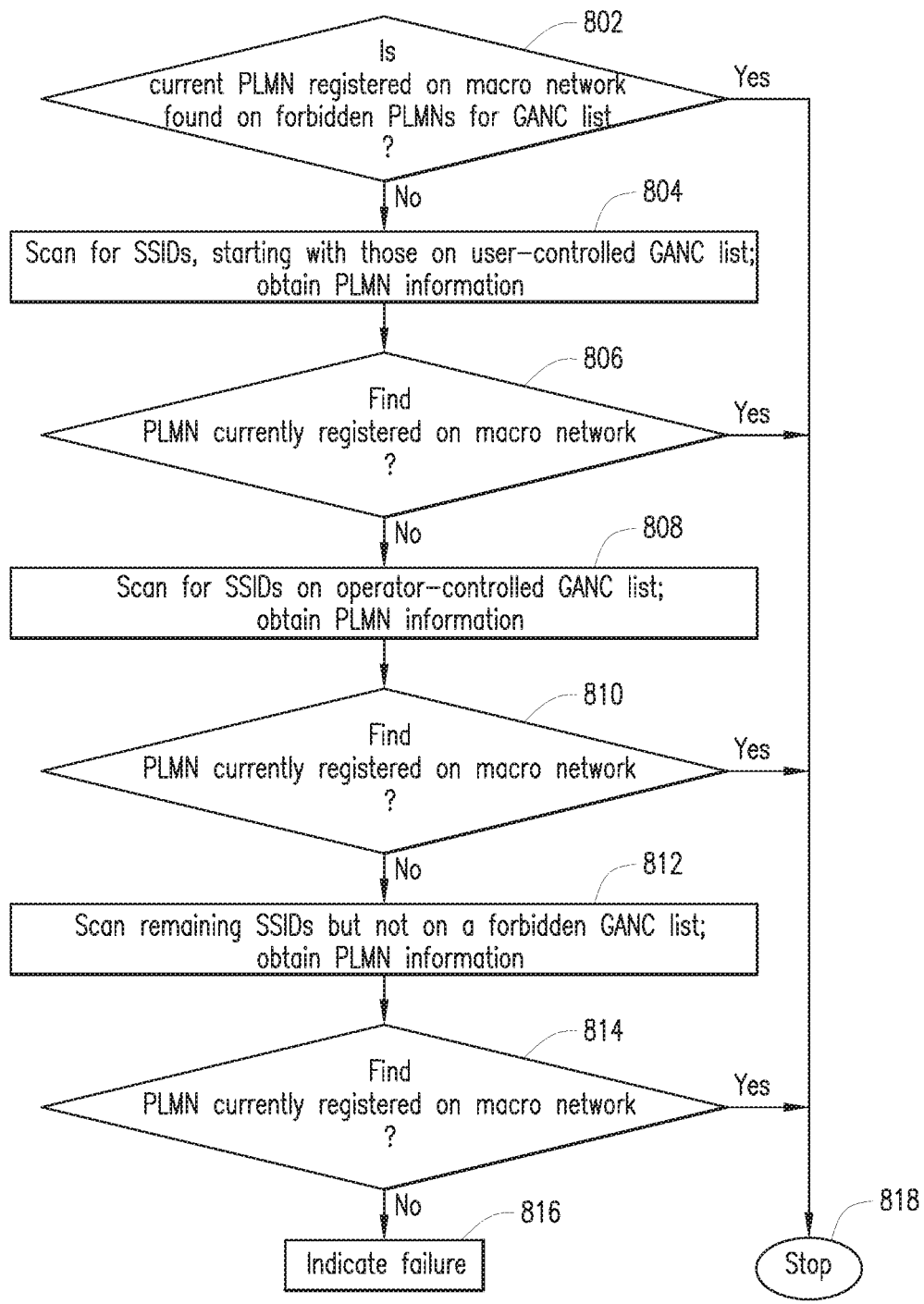
FIG. 8 is a flowchart of a network discovery and selection method according to yet another embodiment.

FIG. 8 is a flowchart of another embodiment of a process operable with a UE device currently registered on a PLMN. A determination is made if current PLMN registered on macro network is found any forbidden list, e.g., Forbidden PLMNs for GANC access (block 802). If so, the process flow stops (block 818). Otherwise, the UE device scans for SSIDs in the GAN/WLAN bands in order to obtain the PLMNs supported by each SSID and performs necessary PLMN discovery procedures as described in the 3GPP TS 23.234 and 3GPP TS 24.234 specifications (block 804). In one implementation, the scanning may start with the SSIDs in a user-controlled Preferred SSID list for GANC access. As alluded to before, scanning operations for purposes of the present disclosure may involve either active or passive scanning mechanisms. If the PLMN with which the device is registered is found in the list of PLMNs obtained via SSID scanning (decision block 806), the process flow stops (block 818). Thereafter, the UE device is operable to scan for SSIDs from an operator-controlled Preferred SSIDs list for GANC access, whereupon appropriate PLMN information obtained (block 808). Again, if the current PLMN is found in the list of PLMNs obtained (decision block 810), the process flow stops (block 818). Otherwise, the UE device proceeds to scan for any remaining SSIDs that are not on any "forbidden" lists (e.g., Forbidden PLMNs for GANC access list) (block 812). Once again if the current PLMN is found in the list of PLMNs obtained (decision block 814), the process flow is terminated (block 818). Otherwise, a failure is indicated (block 816).

FIG. 9A depicts a structure 900A having a plurality of PLMN-based lists that may be used in refining the network discovery/selection mechanism according to one embodiment. Column 902 refers to a list of PLMNs discovered via macro network bands, which are identified by a suitable identifier (e.g., the [MCC, MNC] combinations). By way of illustration, {PLMN10, PLMN22, PLMN33} are exemplified as the discovered networks that are stored in resident memory of a UE device or in a SIM/RUIM associated therewith. Column 904 refers to a list of operator-controlled Preferred PLMNs for GANC/WLAN access. Likewise, columns 906 and 908 respectively refer to a list of user-controlled PLMNs for GANC/WLAN access and a list of forbidden PLMNs for GANC/WLAN access. One or more capability indicator columns, e.g., 3GPP capability indicator column 910, may also be stored for facilitating an enriched network selection process.

FIG. 9B depicts a structure 900B having a plurality of Service Set ID (SSID)-based lists that may be used as scanning filters in refining the network discovery/selection mechanism according to one embodiment. Column 950 refers to a list of operator-controlled Preferred SSIDs for GANC access, which are used iteratively in scanning for any PLMNs supported by each of the SSIDs. By way of illustration, a list of {SSID1, SSID10, SSID15, SSID18} are exemplified, each of which may be associated with one or more PLMNs supported thereby. Likewise, columns 952 and 954 respectively refer to a list of user-controlled SSIDs for GANC/WLAN access and a list of forbidden SSIDs for GANC/WLAN access. Associated with each SSID shown in the lists is a set of PLMNs that are supported for access via a GAN/WLAN.

Referring now to FIG. 10, depicted therein is a database structure 1000 having one or more PLMNs identified after correlating the PLMNs discovered in multiple modes (e.g., in a cellular band and in a GAN/WLAN band). Column 1002 refers to a list (List 1) of PLMNs discovered via scanning in a first band (e.g., GAN/WLAN band) that may or may not have been processed through applicable scanning filters. By way of illustration, List 1 comprises networks identified as PLMN-a, PLMN-b, PLMN-j, PLMN-m, and PLMN-r. Column 1004 refers to another list (List 2) of PLMNs discovered via scanning in a second band (e.g., WACN cellular band), wherein PLMN-b, PLMN-k, PLMN-m, PLMN-o, and PLMN-p are illustrative. Column 1006 refers to a set of PLMNs obtained after correlating between List 1 and List 2, which may or may not have been processed through applicable selection filters. As shown in this example, a set of two PLMNs, i.e., {PLMN-b; PLMN-m}, is obtained after correlation, out of which one may be selected based on capabilities with respect to GPRS, UMA (see, e.g., http://www.umatechnology.org/index.htm), and so on.

Figure 11:
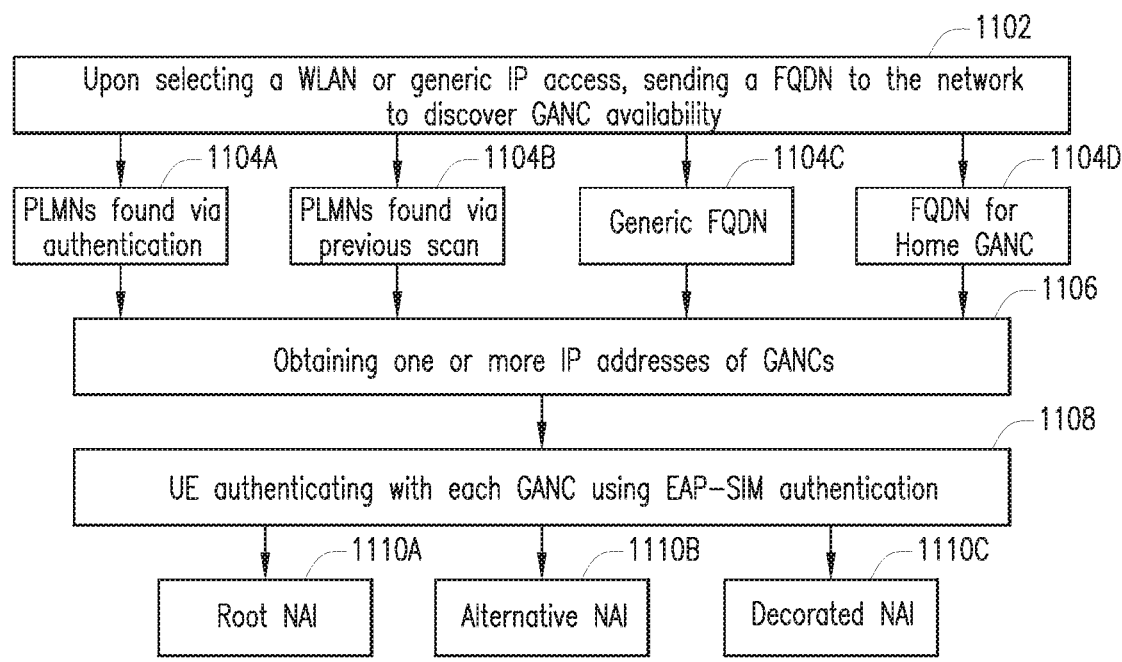
FIG. 11 is a flowchart of a GANC selection method according to one embodiment.

Once a GAN/WLAN has been selected and an IP address has been allocated, the UE needs to discover a GANC node in the network and register with it for obtaining service. As can be appreciated, the GANC node may be implemented as a virtual partition or otherwise, and may be deployed as part of PLMN/BSS infrastructure or as a separate entity. FIG. 11 is a flowchart of a GANC discovery/selection method according to one embodiment. A TCP/IP address query/interrogation mechanism may be used in one implementation. At block 1102, network logic provided with the UE device is operable to send a Fully Qualified Domain Name (FQDN) to the network to discover GANC availability. As is well known, FQDN is a human-readable TCP/IP name corresponding to the TCP/IP address of a network interface, as found on a computer, router, server, or other networked equipment. It includes both its host name and its domain name that uniquely identifies the particular network interface with which it is associated. In accordance with the teachings of the present disclosure, the FQDN may be constructed in a number of ways:

- If a list of PLMNs has been obtained via Extensible Authentication Protocol (EAP) authentication, the UE may select an appropriate PLMN using the PLMN lists stored in the UE and construct a unique FQDN that will obtain the IP address(es) for GANC to access that PLMN, e.g., www.MCCxyzMNCabcganc.com (block 1104A).
- If a list of PLMNs has not been obtained and the UE has previously done a cellular scan and found a number of PLMNs, the UE may construct unique FQDNs for each of those PLMNs. The UE may receive response to none to all of the FQDNs (block 1104B).
- If a PLMN scan has not been performed or no response was received to the unique FQDN request, the UE may send a generic FQDN, e.g., www.ganc.com, whereupon the UE may receive a response to the FQDN request containing one or more GANC addresses (block 1104C).
- If no response to the generic FQDN is received, the UE may send a FQDN for its home GANC (block 1104D).

Accordingly, by appropriately constructing the FQDN and sending it to the network, one or more IP addresses of GANCs may be obtained (block 1106), whereupon the UE authenticates each GANC using EAP-SIM authentication or other appropriate EAP mechanisms such as EAP-AKA (Authentication and Key Arrangement) (block 1108). Three options may be provided with respect to the choice of identity to be included in the EAP message:

(i) Root NAI: This identity may be included by the UE either during automatic selection or manual selection procedures (block 1110A). For example, during an automatic selection procedure, this NAI may be used only when the UE intends to trigger the network discovery procedure or when the UE is aware that the GANC has direct connection to HPLMN. During a manual selection mode, this NAI may be used by the UE only when the user has chosen the HPLMN from the available PLMN list provided.

(ii) Alternative NAI: This identity shall be included by the UE when it wants to obtain a list of available PLMNs from the GANC during a manual selection procedure (block 1110B). When the GANC receiving the EAP-Response/Identity message recognizes the special realm portion of this NAI formatted as specified in the 3GPP TS 23.003 [1A] specification, it forwards the network advertisement information to the UE.

(iii) Decorated NAI: This identity may be included either when the UE is aware that GANC does not provide direct connection to HPLMN and it has information from previous authentications about the VPLMNs supported by this GANC or when a user during the manual selection procedure selects a different PLMN other than HPLMN (block 1110C).

Figure 12:
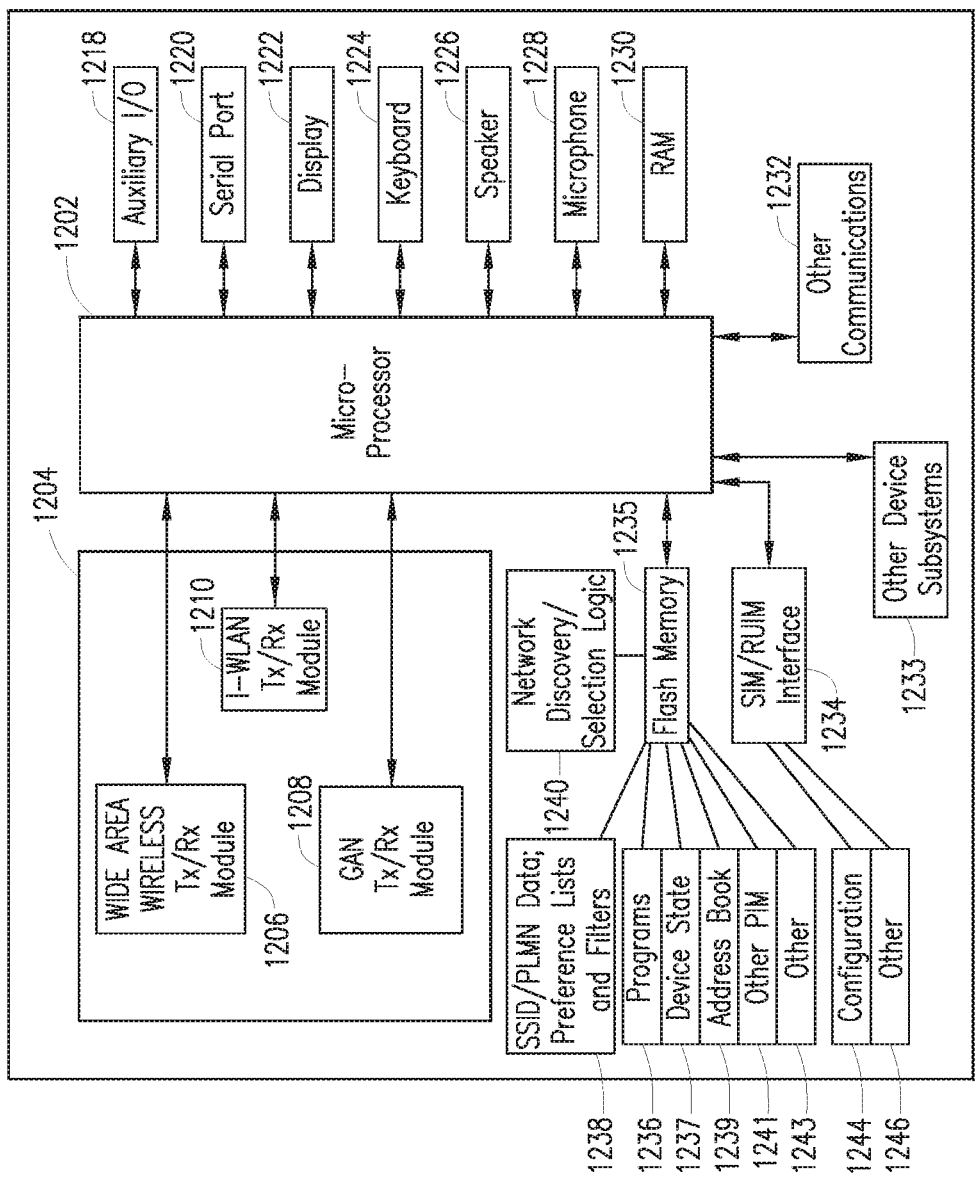
FIG. 12 depicts a block diagram of an embodiment of a UE device operable to perform the network discovery/selection procedures set forth according to the teachings of the present patent disclosure.

Referring now to FIG. 12, depicted there is a block diagram of an embodiment of a UE device operable to perform the network discovery/selection procedures set forth according to the teachings of the present patent disclosure. It will be recognized by those skilled in the art upon reference hereto that although an embodiment of UE 102 may comprise an arrangement similar to one shown in FIG. 12, there can be a number of variations and modifications, in hardware, software or firmware, with respect to the various modules depicted. Accordingly, the arrangement of FIG. 12 should be taken as illustrative rather than limiting with respect to the embodiments of the present patent disclosure. A microprocessor 1202 providing for the overall control of an embodiment of UE 102 is operably coupled to a communication subsystem 1204 which includes transmitter/receiver (transceiver) functionality for effectuating multimode communications over a plurality of bands. By way of example, a wide area wireless Tx/Rx module 1206, a GAN Tx/Rx module 1208 and an I-WLAN Tx/Rx module 1210 are illustrated. Although not particularly shown, each Tx/Rx module may include other associated components such as one or more local oscillator (LO) modules, RF switches, RF bandpass filters, A/D and D/A converters, processing modules such as digital signal processors (DSP), local memory, etc. As will be apparent to those skilled in the field of communications, the particular design of the communication subsystem 1204 may be dependent upon the communications networks with which the UE device is intended to operate. In one embodiment, the communication subsystem 1204 is operable with both voice and data communications.

Microprocessor 1202 also interfaces with further device subsystems such as auxiliary input/output (I/O) 1218, serial port 1220, display 1222, keyboard 1224, speaker 1226, microphone 1228, random access memory (RAM) 1230, a short-range communications subsystem 1232, and any other device subsystems generally labeled as reference numeral 1233. To control access, a Subscriber Identity Module (SIM) or Removable user Identity Module (RUIM) interface 1234 is also provided in communication with the microprocessor 1202. In one implementation, SIM/RUIM interface 1234 is operable with a SIM/RUIM card having a number of key configurations 1244 and other information 1246 such as identification and subscriber-related data as well as one or more SSID/PLMN lists and filters described in detail hereinabove.

Operating system software and other control software may be embodied in a persistent storage module (i.e., non-volatile storage) such as Flash memory 1235. In one implementation, Flash memory 1235 may be segregated into different areas, e.g., storage area for computer programs 1236 as well as data storage regions such as device state 1237, address book 1239, other personal information manager (PIM) data 1241, and other data storage areas generally labeled as reference numeral 1243. Additionally, appropriate network discovery/selection logic 1240 may be provided as part of the persistent storage for executing the various procedures, correlation techniques, and GANC selection mechanisms set forth in the preceding sections. Associated therewith is a storage module 1238 for storing the SSID/PLMN lists, selection/scanning filters, capability indicators, et cetera, described in detail hereinabove.

Accordingly, one embodiment of the UE device may include appropriate hardware, firmware, and software that may be comprised of the following: a communication subsystem including a transceiver module for communicating in a first band and a transceiver module for communicating in a second band; a logic module operable to generate a first list of available wide area cellular networks discovered through scanning in the first band; a logic module operable to generate a second list of available wide area cellular networks discovered through scanning in the band; a logic module operable to correlate the first and second lists of available wide area cellular networks for identifying a set of wide area cellular networks common to both lists; and a logic module operable to select a particular wide area cellular network from the set of wide area cellular networks common to the first and second lists. In a yet another embodiment, the UE device may include, either alternatively or additionally, the following: a logic module operable to generate a FQDN for transmission by said UE device to a GAN; and a logic module, operable responsive to one or more IP addresses obtained from the GAN, each IP address corresponding to a GANC node operably coupled to a PLMN, for authenticating with at least one GANC node for obtaining access service via the GAN to a PLMN operably coupled thereto.

Based on the foregoing discussion, it should be apparent that with the use of 3GPP and GAN-capable dual mode UEs, there are a number of ways that the user-experience can be improved. The following description provides a non-exhaustive synopsis that exemplifies some of the specific scenarios, with a view towards providing optimization for them, particularly in terms of: (i) rapid selection and system acquisition, and (ii) enabling the user (who knows where (s)he is) to select and acquire GAN.

I. Use Case Scenario A: Turn-On Handset (i.e., UE) at Home

ƒ User turns on handset at home in the morning.

ƒ No need to check for 3GPP WACN (cellular) signals.

ƒ Provide a specific setting for the device power-up.

ƒ It is possible to tailor that to the time setting, so that power-up within a time window is considered "at home" power-up; at other times, the standard check for 3GPP WACN signals may occur first.

ƒ Check for <home AP>, or if user has entered it, <home AP> and nearby APs. If none, go to 3GPP (cellular).

II. Use Case Scenario B: Return Home

ƒ Provide a user-control to easily and quickly have the UE check for <home AP>.

ƒ User can use this when returning home.

ƒ If no <home AP>, then go to 3GPP (cellular).

III. Use Case Scenario C: Home-Related

ƒ Travel setting (i.e., roaming), that is effective until a predetermined <date:time> setting.

ƒ Indicating whether to check for local GAN/WLAN, and which particular one.

ƒ Indicating repetitive scheduling—weekly or other.

IV. Use Case Scenario D: Specific Locations

ƒ Repetitive visits:

ƒ Work—can store <work AP>.

ƒ Provide a user-control to easily and quickly have the handset check for <work AP>.

ƒ Coffee Shop/bakery—can store <coffee shop AP>.

ƒ Provide a user-control to easily and quickly have the handset check for <coffee shop AP>.

ƒ Temporary visits:

ƒ Hotel XYZ—can store <hotel xyz AP>.

ƒ Provide a user-control to easily and quickly have the handset check for <hotel AP>.

ƒ The GAN/I-WLAN may be a moving one (e.g., on an aircraft) and may or may not be associated with several PLMNs. There may be a cellular microcell on the aircraft, however, that may be identified in some manner, including a combination such as [MCC, MNC].

V. Use Case Scenario E: Using Location Information

Location information from a number of sources can be used to tailor the UE device to the user's patterns. Information sources include:

ς LAI/CGI

ς HPLMN

ς Other PLMNs, whether preferred or forbidden

ς AGPS (Assisted Global Positioning System) or other non-cellular band location system ς Manual input VI. Use Case Scenario F: Tailoring of the System Selection The locations may be individually used to tailor the mode of operation. Examples include:

ς connected to <home AP>

ς connected to <work AP>

ς connected to <[other] AP>, and so on

Furthermore, it should be apparent that the connectivity information may be specifically used to provide location information for Emergency Services, in certain cases. The full utilization of the information may require additions or changes in the information provided to the Public Safety Answering Point or PSAP (e.g., a 911 dispatch center, local fire or police department, an ambulance service or a regional office covering multiple services). Additionally, further modifications may also be required to the interface and messages exchanged between the PSAP and the operator (PLMN), and in the PSAP itself. The information may be in the form of the address where the AP(s) are located, including floor, room number and description of the location of the room, together with an indication of the signal strength and the potential "spill-over" coverage.

It is believed that the operation and construction of the embodiments of the present patent disclosure will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A method, operable on a user equipment (UE) device, for network selection, the method comprising:
   registering on a first network in a wide area cellular network (WACN) space; and
   while the UE device is registered on the first network:
      receiving, from a wireless local area network (WLAN), a list of one or more networks in the WACN space, wherein each network of the one or more networks supports one or more generic access networks (GANs); and
      selecting the WLAN in response to determining that the first network on which the UE device is registered is on the list of the one or more networks in the WACN space.

2. The method according to claim 1 further comprising authenticating with the WLAN.

3. The method according to claim 2 further comprising handing over a service from the first network to the WLAN.

4. The method according to claim 3 wherein the service is a telephony service.

5. The method according to claim 3 wherein the service is a packet-switched data service.

6. The method according to claim 1 wherein an indication that the WLAN supports GAN capabilities is stored on the user equipment device.

7. The method according to claim 6, wherein the GAN capabilities includes handover.

8. The method according to claim 1 wherein the first network appears as an entry in an operator-controlled Preferred PLMN list for GAN controller (GANC) access.

9. The method according to claim 1 wherein the first network appears as an entry in an user-controlled Preferred PLMN list for GANC access.

10. A user equipment (UE) device comprising:
    a processor operably connected to a transceiver subsystem and to a memory, the memory containing instructions that when executed by the processor perform a method comprising:
       registering on a first network in a wide area cellular network (WACN) space; and
       while the UE device is registered on the first network;
          receiving, from a wireless local area network (WLAN), a list of one or more networks in the WACN space, wherein each network of the one or more networks supports one or more generic access networks (GANs); and
          selecting the WLAN in response to determining that the first network on which the UE device is registered is on the list of the one or more networks in the WACN space.

11. The UE device according to claim 10 wherein the method further comprises authenticating with the WLAN.

12. The UE device according to claim 11 wherein the method further comprises handing over a service from the first network to the WLAN.

13. The UE device according to claim 12 wherein the service is a telephony service.

14. The UE device according to claim 12 wherein the service is a packet-switched data service.

15. The UE device according to claim 10 wherein an indication that the WLAN supports GAN capabilities is stored on the user equipment device.

16. The UE device according to claim 15, wherein the GAN capabilities includes handover.

17. The UE device according to claim 10 wherein the first network appears as an entry in an operator-controlled Preferred PLMN list for GAN controller (GANC) access that is stored on the UE device.

18. The UE device according to claim 10 wherein the first network appears as an entry in a user-controlled Preferred PLMN list for GANC access that is stored on the UE device.

19. A non-transitory computer-readable medium containing instructions which, when executed, cause a user equipment (UE) device to perform operations comprising:
    registering on a first network in a wide area cellular network (WACN) space; and
    while the UE device is registered on the first network:
       receiving, from a wireless local area network (WLAN), a list of one or more networks in the WACN space, wherein each network of the one or more networks supports one or more generic access networks (GANs); and
       selecting the WLAN in response to determining that the first network on which the UE device is registered is on the list of the one or more networks in the WACN space.

* * * * *